Aug. 21, 1945.  N. MEDVED  2,383,142
ROLLER BEARING
Filed Nov. 26, 1943
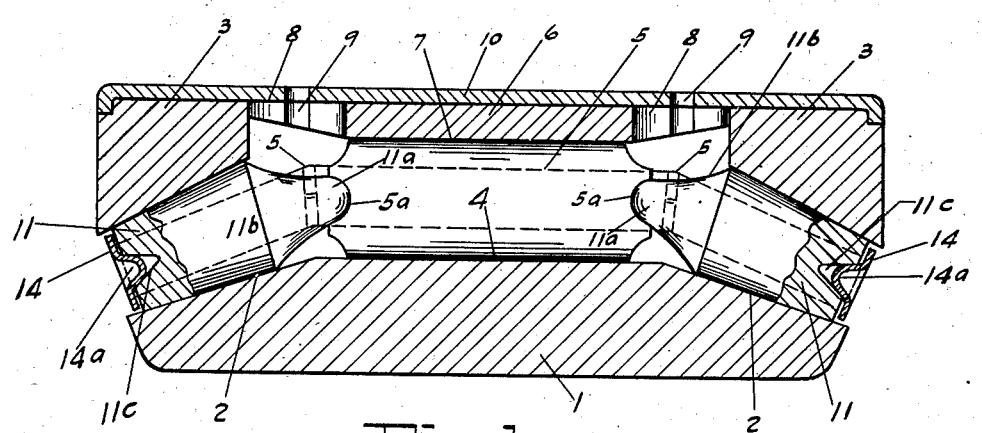
Fig. 1.
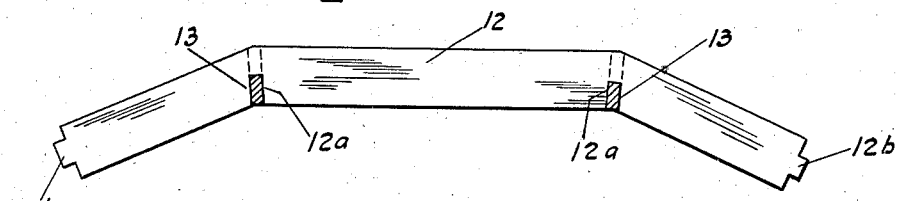
Fig. 2.
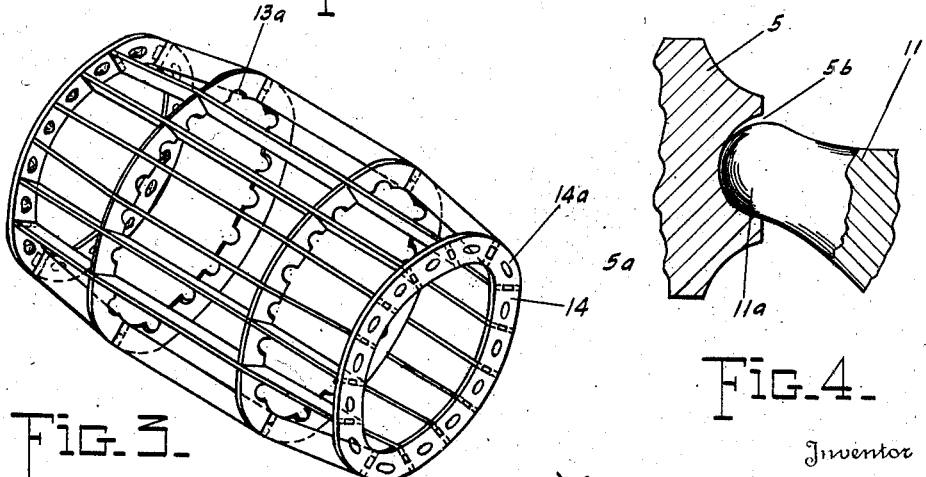
Fig. 3.
Fig. 4.
Inventor
Nicholas Medved
By Robert Robb
Attorneys Patented Aug. 21, 1945

2,383,142

UNITED STATES PATENT OFFICE 2,383,142

ROLLER BEARING

Nicholas Medved, Cleveland, Ohio

Application November 26, 1943, Serial No. 511,830

3 Claims. (Cl. 308—214)

My present invention embodies improvements in double thrust roller bearings of the type generally disclosed in my United States Patent No. 1,885,852, issued November 1, 1932, and particularly the construction of bearing depicted in Figures 3 and 4 of said patent.

In the prior construction of bearing of my patent as above referred to, the roller bearing comprises tapered end rollers in spaced relation disposed to resist thrust loads from either direction, and intermediate cylindric rollers rendering the bearing especially adapted for resisting not only the thrust loads from either direction, but large radial loads. The said prior construction avails of reduced tapered bearing members or elements at the ends of the cylindric rollers, the same entering shallow bearing sockets in the end tapered rollers, the cooperation of the said rollers affording a substantial reduction in the friction resulting from the operation of the same, and particularly that friction which is derived from direct and component thrust loads.

Now, while the said prior bearing construction as designed by me has been found serviceable and practical in lighter bearing units where the same is used, for heavy duty units the tapered bearing members of the cylindric rollers have a tendency to break down and thus destroy the efficiency of the bearing unit.

In view of the foregoing difficulty of practice of my prior inventions as adapted to heavy bearing structures, I have re-designed said bearing according to the improvements of the present invention in such a manner as to provide the intermediate cylindric bearing rollers with end spherical bearing sockets to receive complemental end bearing members at the inner ends of the tapered or end rollers, and I have formed the said end bearing members of the tapered rollers with the particular object of not only providing spherical bearing sockets of the cylindric rollers, but said end bearing members have been additionally formed so as to gradually enlarge from the actual spherical bearing ends of the members to the point where the bearing members merge into the periphery of the tapered rollers. By such construction I obtain a strengthened formation of the bearing members of the tapered rollers such that these members do not break down or will not ultimately become crushed or destroyed incident to the thrust and radial loads that may be imposed upon the bearing unit.

In addition to the foregoing, and ancillary to the improvements referred to, I have designed a novel form of cage for the bearing unit of my present invention for facilitating the proper emplacement of the bearing rollers in relation to the inner and outer raceways engaged by said rollers and commonly found in bearing units of the type of my invention. The said improved cage is designed for the proper spacing of the bearing rollers both circumferentially and axially of the units.

A full understanding of my present improvements will be had by reference to the accompanying detail description and the attached drawing, in which—

Figure 1 is a transverse vertical section of my improved form of roller bearing.

Figure 2 is a sectional view of a portion of the cage including the axially disposed spacer plates and the inner spacer rings united thereto by a peculiar bent disposition of the ends of said plates.

Figure 3 is an isometric perspective view of the assembled bearing cage employed for the purposes of the present invention.

Figure 4 is an enlarged fragmentary detail view of the cooperating bearing parts of the cylindric and tapered rollers showing a clearance phase of the construction.

In addition to the following description reference is made to my Letters Patent previously referred to, to facilitate an understanding of the advantages of my present bearing unit and the specific action of the roller elements thereof as presented in the said patent, since the said advantages are substantially those presented in the prior art disclosure referred to.

A detail description of my present bearing is now supplied by direct reference to the construction disclosed in the accompanying drawing. It will be seen that my improved bearing unit includes the inner sleeve 1 provided at its opposite sides with the cones or raceways 2 disposed opposite and spaced from the outer bearing sleeves or cups 3. Intermediate the cones or raceways 2 the sleeve 1 is formed with the raceway 4 to receive for rolling contact therewith the cylindric rollers 5. Opposite the raceway 4 is the intermediate sleeve 6 having the raceway 7 which surrounds the rollers 5 at the outer sides thereof. The sleeve 6 is held in properly spaced relation to the cups or raceway members 3 by end projections 8 formed at the opposite side edges of the member 6 and located at intervals along said edges which are annular in view of the circular form of the members 6. Suitable oil holes 9 may be provided in the spacing projections 8 and register with similar oil holes in the housing or metal casing 10 which generally encloses the entire bearing unit.

Tapered rollers 11 for resisting the thrust loads of the bearing are provided and located intermediate the inner raceway surfaces of the sleeves or cups 3 and the outer conical raceway surfaces 2 of the inner sleeve 1 of the bearing unit.

For providing bearing engagement between the cylindric rollers 5 and the tapered rollers 11, the rollers 5 at the ends thereof are formed with spherical sockets 5a centrally located in the said ends and thereby substantially concentric with the axis of the rollers 5. Additionally, the tapered rollers 11 at their inner ends are peculiarly formed to provide the spheric bearing members 11a, which bearing members enter the sockets or bearing recesses 5a of the cylindric rollers 5. The bearing members 11a are virtually terminal members of symmetrically tapered end extensions 11b at the end or ends of the said rollers 11. In other words, the formation of the metal structure of each roller 11 at its inner portion provides the spherical bearing members 11a constituting extremities of the tapered end extensions 11b which virtually involve outward prolongations of the members 11a of increasing diameter from the bearing surfaces of the parts 11a to the adjacent end of the peripheral portions of the rollers 11. By this construction, a considerable body of metal joins the bearing members 11a with the tapered body portions of the rollers 11, and this has been found in practice to remedy the difficulty of breakage or crushing of the bearing members as used in my previous patented structure incident to the thrust and radial loads which are carried by the bearing under actual conditions of service.

For properly positioning the rollers 5 and 11 in longitudinal relation and for assisting in properly spacing each series of such rollers from the next adjacent series circumferentially of the bearing, I avail of a cage structure. This cage structure is seen best in the drawing, especially in Figure 3, and comprises the axially disposed plates 12 which are notched at 12a at their inner edges to receive the spacer rings 13. The spacer rings 13 are provided at intervals at their inner peripheral edges with recesses 13a affording partial bearings receiving the bearing members 11a.

At the opposite ends or series of axially disposed plates 12 are provided bearing rings 14 having pressed-in conical centers 14a adapted to fit into outer end bearing sockets 11c of the tapered rollers 11. The rings 14 are formed with radial slots at intervals therein, and end projections 12b on the axially disposed spacing plates 12 pass through the said slots and may have their outer ends upset or swaged so as to unite the rings 14 with the plates 12, thus providing an assembly unit including the parts 12, 13, and 14. In producing this assembly unit, I contemplate forming the slots 12a in the plates 12 when the said plates are somewhat straighter than illustrated in Figure 2, and then bending the ends of the plates inwardly in relation to the middle portions so as to crimp or clamp the walls of the slots 12a against the plates 13, thus to prevent any circumferential displacement of the parts 13 in relation to the plates.

By the peculiar construction of the spheric bearing members 11a, joined as they are to the larger ends of the rollers 11 by a relative large amount of metal in the roller end extension 11b, materially increased strength of the bearing member is obtained. This is due to the fact that during manufacture, in the cooling of the roller in the hardening process the cooling action of the roller 11 body portion, and the portions 11a and 11b is relatively uniform. In my previous patented construction herein identified, since the spheric inner bearing members of the rollers are of considerably reduced size compared with the adjacent body diameter, they cool much faster than the roller body while hardening, and the area of joinder metal of the bearing member to the roller body is so weakened that the breaking and crushing off of the bearing member is promoted. This creates the problem of maintaining the integrity of the roller body metal by forming the same so that when it is made, the strength is uniform practically throughout the entire body from one terminal to the other, something which I have accomplished by my present improvements.

The bearing sockets 5a are so formed in the ends of the rollers 5 that flat end parts are provided which extend rectilinearly of the roller 5 and terminate at the peripheral portion of each end some distance from the sockets. The shape of the bearing member 11a fitting in each socket is such as to afford a slight clearance at the outer portion that rolls in the socket, as seen at 5b in the enlarged view, Figure 4. By such provisions the ends of the rollers 5 at the sockets 5a are prevented from wearing grooves or breakage recesses in the sides of the bearing members 5a, thus enhancing the wear stability of the latter members.

It will thus be observed from the foregoing description that I have provided a simple and efficient construction of tapered rollers forming the outer thrust elements of the bearing unit which cooperates with the intermediate cylindric rollers with great strength at the contacting bearing portions of said parts, avoiding the disadvantages of my previous construction as hereinbefore pointed out. Likewise, I have provided a simple construction of bearing cage, the parts of which may be easily assembled and will axially cooperate with the roller elements, as well as the bearing sleeves and cones having the raceway surfaces for the rollers, to maintain the rollers in their proper positions in the bearing unit.

If desired, there may be provided between the spaced rollers 11, intermediate spacing rollers, not shown, but such as generally disclosed in my previous patent herein identified, and such spacing rollers may, if desired, be located intermediate the cylindric rollers 5.

Having thus described my invention, what I claim as new and desire to secure by Letters Patent of the United States, is:

1. In a roller bearing of the class described, in combination, an inner sleeve provided with end raceways or cones and a straight raceway between said end raceways, end cups having outer raceways spaced from the raceways or cones of said sleeve, an outer sleeve intermediate said end cups and having a straight raceway parallel to and spaced from the straight raceway of the inner sleeve, cylindric rollers intermediate the outer sleeve and the inner sleeve for resisting radial loads; tapered rollers at the ends of the cylindric rollers and disposed between the raceways of the end cups and the cones or raceways of the inner sleeve, said cylindric rollers being formed with spherical sockets in their end portions, and the said tapered rollers having at their inner ends spherical bearing members, the inner ends of the tapered rollers being provided with end extensions symmetrically tapered from the inner extremities of their peripheral portions to the spherical bearing members which virtually form the ends of said extensions, so that the body of the tapered rollers merges from the inner bearing periphery to the spherical bearing members to ensure uniform hardening, said inner end bearing members of the tapered rollers being seated for bearing engagement in the bearing sockets in the ends of the cylindric rollers.

2. A roller bearing as set forth in claim 1, characterized in that the end extensions and bearing members at the inner ends of the tapered rollers together constitute a symmetrically tapered end of each tapered roller directly tapering from the inner extremity of the tapered peripheral portion of the roller to the inner extremity of the bearing member portion.

3. In a roller bearing of the class described, in combination, an inner sleeve provided with end raceways or cones and a straight raceway between said end raceways, end cups having outer raceways spaced from the raceways or cones of said sleeve, an outer sleeve intermediate said end cups and having a straight raceway parallel to and spaced from the straight raceway of the inner sleeve, cylindric rollers intermediate the outer sleeve and the inner sleeve for resisting radial loads, tapered rollers at the ends of the cylindric rollers and disposed between the raceways of the end cups and the cones or raceways of the inner sleeve, said cylindric rollers being formed with spherical sockets in their end portions, and the said tapered rollers having at their inner ends spherical bearing members, said inner end bearing members of the tapered rollers being seated for bearing engagement in the bearing sockets in the ends of the cylindric rollers, and a cage cooperating to position the cylindric and tapered bearing rollers longitudinally of one another and for spacing sets of such rollers circumferentially of said bearing unit, including axially disposed plates spaced from and at the sides of each set of cylindric and tapered rollers, rings spaced from the ends of the axial plates and inset in slots at the inner edges of said plates, said rings having spacing recesses engaging the bearing members at the inner ends of the tapered rollers and being clampingly engaged in the slots of the axially disposed plates by bending of the latter to engage said rings, and outboard bearing rings at the ends of the axially disposed plates connected with such ends and formed with conical centers engaging in bearing recesses in the outer ends of the tapered rollers, the said bearing rings and spacer rings being parallel with each other and circumferential of the bearing unit, and the axial plates being substantially parallel with each other and extending axially of said unit as well as relatively parallel to each set of longitudinally disposed cylindric rollers and tapered end rollers.

NICHOLAS MEDVED.